Figure 1:
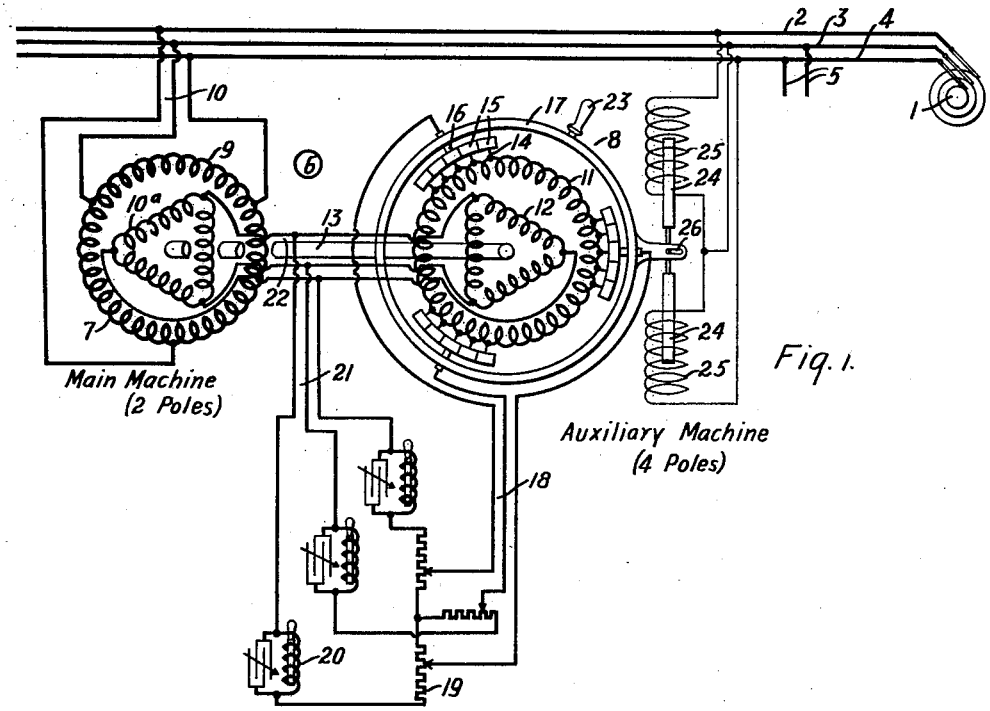

C. LE G. FORTESCUE.
POLYPHASE DISTRIBUTING SYSTEM.
APPLICATION FILED NOV. 18, 1916. RENEWED SEPT. 2, 1920.

1,376,422. Patented May 3, 1921.

WITNESSES:
Fred A. Lind.
Geo. W. Hansen.

INVENTOR
Charles LeG. Fortescue
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

POLYPHASE DISTRIBUTING SYSTEM.

1,376,422. Specification of Letters Patent. Patented May 3, 1921.

Application filed November 18, 1916, Serial No. 132,088. Renewed September 2, 1920. Serial No. 407,824.

*To all whom it may concern:*

Be it known that I, CHARLES LE G. FORTESCUE, a subject of the King of England, and a resident of Pittsburgh, in the county of Allegheny and State of Pennsylvania, have invented a new and useful Improvement in Polyphase Distributing Systems, of which the following is a specification.

My invention relates to electrical distributing systems and it has special relation to polyphase transmission systems embodying distributing circuits and phase-balancing means for maintaining symmetrical polyphase conditions in the systems.

It is desirable to so select the load on the several phases of a polyphase-distributing system as to prevent excessive unbalancing of the phase-voltages and currents. Unless such care is exercised, the transmission system will not operate economically and its ultimate load capacity will be considerably reduced. Moreover, polyphase apparatus designed for balanced voltages and currents will be adversely affected when connected to an unbalanced polyphase system. For instance, undesirable temperatures may develop in portions of the polyphase apparatus unless the windings of such apparatus are specially designed to carry unbalanced currents. Again, emergency conditions frequently demand that two or more polyphase systems be interconnected to effect an interchange of electrical energy between them. But it is objectionable and inefficient to do this when one of the systems is considerably unbalanced because the unbalanced system will reflect its unbalanced conditions to any satisfactorily balanced system which may be connected to it.

It is well known that an ideal phase-balancer will also serve as a phase-splitter or converter to transform a single-phase current into balanced polyphase currents, and vice versa. Of course, when performing this function, the phase-balancer is operating under such special conditions as may be represented by a phase-balancer that is connected to a polyphase system in which all of the loads are connected to a single phase thereof, or by a phase-balancer employed to maintain balanced polyphase conditions at a point in a normally balanced polyphase system that is connected to a single-phase system from which part of the power is supplied. While one phase is loaded to the exclusion of the other phases, all of the phases contribute equal amounts of power to the loaded phase through the intermediary of the phase-balancing means and vice versa. Since the phase balancer thus automatically effects an equal division of power among the several phases of a polyphase system, it may also be considered as a phase-splitter or a phase-converter.

One object of my invention is to provide a phase-balancing means of the character above mentioned which will also serve, when special conditions require, as a phase-converter. The phase-balancing means of the present invention will also automatically effect an equal division of the load among the several phases of a polyphase system, irrespective of the loading of the several phases, the power-factors of the loads and other asymmetrical conditions obtaining therein.

Figure 2:
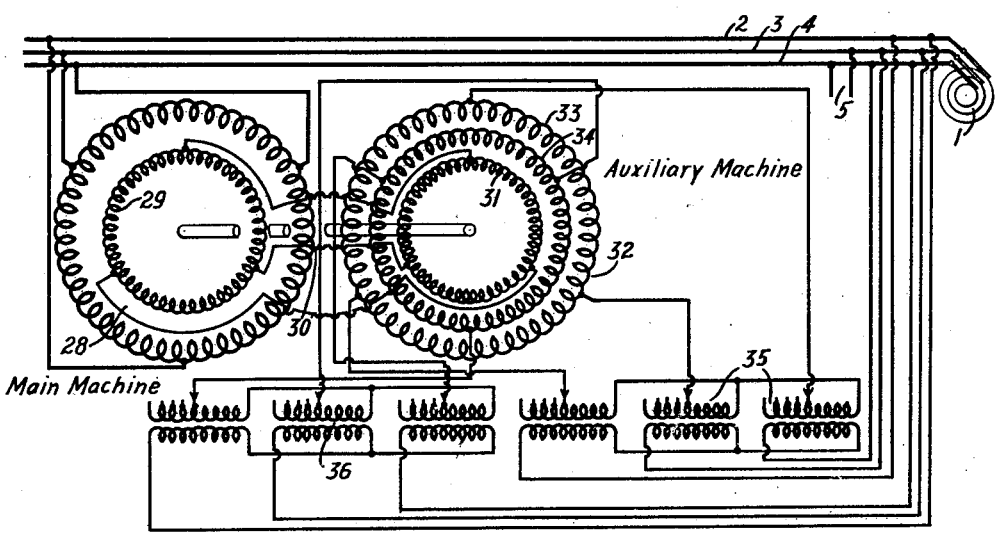

For a better understanding of the nature and scope of my invention, reference may be had to the following description and the accompanying drawing in which Figure 1 is a diagrammatic view of a distributing system embodying a form of my invention, and Fig. 2 is a similar view showing a modification of the system illustrated in Fig. 1.

Any unbalanced polyphase electromotive forces or currents, which may be represented by a system of vectors of different magnitudes but capable of forming a closed polygon, may be resolved into two component systems of balanced vectors. One of the component systems of balanced vectors, which I will designate as the load-component, has the same phase rotation as that of the resultant system of unbalanced vectors, and the other component system of balanced vectors, which I will designate as the unbalancing-component, has a phase rotation opposite to that of the resultant system.

In an unbalanced polyphase power system, the unbalancing-component of the electromotive forces which, as stated above, constitutes a balanced polyphase system of vectors of phase rotation opposite to that of the system, will be proportional to the product of the corresponding unbalancing-component of the polyphase currents and the impedance of the system offered to the flow of these unbalancing-component currents. The relative division of the unbalancing-component of the currents among the various polyphase machines connected to the polyphase system will depend upon the respective impedances of said machines offered to the flow of the currents forming the unbalancing-component. Synchronous machines and induction motors offer a very low impedance to the flow of these counter-rotating or unbalancing-component currents, and hence, such devices, connected in the polyphase system at points where there is a concentration of unbalancing load, are liable to be overloaded.

The aforementioned unbalancing-component represents the extent of the unbalancing conditions existing in a polyphase system in which the loads of the several phases are not chosen so that each phase of the system supplies equal quantities of power. If polyphase machines connected to the polyphase system were so designed that they offered zero impedance to the unbalancing-component of the polyphase currents obtaining in the system, the said machines would serve as ideal phase-balancers since, as will be hereinafter explained, the unbalancing-component of the load would be completely eliminated.

When an unbalanced load is supplied from a polyphase system, all the polyphase rotating machines connected to the system tend to act as balancers in order to keep the phase-voltages and phase-currents in balanced relations so that symmetrical polyphase conditions may be approached at the main bus-bars. In particular, symmetrical polyphase machines of low impedance, such as synchronous motors, rotary converters and induction motors, tend to maintain balanced conditions on a polyphase system independently of the load imposed on them.

To understand the theory of operation of the phase-balancer of the present invention, assume that a single-phase synchronous generator is a polyphase synchronous generator subjected to certain unbalanced-load conditions. The polyphase generator supplying the unbalanced load, in this instance, may be considered as being a three-phase generator having zero current flowing in one of its circuits and currents equal to the single-phase load-current flowing in any two of the circuits, the line current obtaining in one of said circuits flowing in a direction opposite to that obtaining in the other circuit. The generator comprises a rotating armature winding connected to the unbalanced polyphase system and a stationary field element on which a polyphase amortisseur or auxiliary winding is disposed.

Since, as mentined above, an unbalanced polyphase load may be resolved into two component loads, one—the load-component—having normal phase-rotation and the other—the unbalancing-component—having counter-phase rotation, synchronous rotating magneto-motive forces having normal phase rotation and synchronous rotating magneto-motive forces having counter-phase rotation are generated within the machine by reason of the unbalanced currents obtaining in said armature winding. The synchronous rotating magneto-motive forces of normal phase rotation are stationary with respect to the said amortisseur winding, while the counter-phase rotating magneto-motive forces, which have the same direction of rotation as that of the armature winding relative to the amortisseur winding, generate double-synchronous-frequency currents in the amortisseur winding. The double-frequency currents thus induced generate polyphase magneto-motive forces which approximate, in value, the magneto-motive forces generated by the unbalancing-component currents flowing in the armature winding. However, the magneto-motive forces generated by these induced currents in the amortisseur winding are not exactly equal to the magneto-motive forces inducing them, because the magnetic coupling or mutual induction between the main or armature winding and the amortisseur winding is not entirely perfect. If it were possible to make this magnetic coupling completely perfect, and if the resistances of the amortisseur and armature windings did not impede the flow of the unbalancing component currents, no reactions to these counter-phase rotating currents would exist and, therefore, the electro-motive forces of the generator would be balanced.

The impedance offered by a dynamo-electric machine to the flow of counter-phase rotational currents may be made extremely low by carefully designing the aforementioned polyphase amortisseur or damper winding. If, in addition, auxiliary means be provided, externally or internally of the machine, to assist the natural action of the machine as a phase-balancer, the admittance of the machine to the counter-phase rotational or unbalancing-component currents may be made infinite so that the terminal voltages of the machine will be absolutely balanced, irrespective of the value of the counter-phase rotational currents tending to flow through the machine.

The ability of an ordinary dynamo-electric machine, such as a polyphase induction motor or a polyphase synchronous machine, to perform the functions of a balancer is measured by the impedance offered by the machine to the counter-phase rotational component of the unbalanced load. Therefore, the action of such an unassisted machine, when connected to an unbalanced polyphase system, consists in supplying counter-phase rotational currents of such values or the unbalancing-component of the load in such amount as will bring the system and the machine to the same degree of unbalancing. The voltage balance of the system is thereby improved at the expense of the voltage balance of the machine. The voltages causing unbalancing at the machine terminals are the impedance-drops resulting from the counter-phase rotational currents supplied by the machine and are, therefore, counter-phase rotational symmetrical polyphase voltages. Therefore, if means are provided for reducing to zero the effective impedance offered to the flow of the unbalancing-component currents in the polyphase system, the phases of said system will be strictly maintained in symmetrical polyphase relationship.

By means of my present invention, balanced polyphase conditions may be maintained in a polyphase distributing system by neutralizing the magneto-motive forces set up in a machine by the unbalancing-component of the load. As a result, the reactions occasioned by the said unbalancing-component of the load will be reduced to zero. In order to neutralize the magneto-motive forces resulting from this unbalancing-component of the load and thereby maintain only balanced polyphase conditions in the supply system, I provide a phase balancer that comprises a main dynamo-electric machine in which polyphase currents of the proper frequency, magnitude and phase displacement are introduced so that the aforementioned magneto-motive forces of the unbalancing-component of the load may be neutralized, irrespective of the load conditions obtaining in the power system. As a result, the terminal voltages of the main machine of the phase balancer will be automatically maintained in a perfectly balanced relation, irrespective of the distribution of the loads in the several phases of the distributing system.

Other features of novelty in my invention will be pointed out with particularity in the claims annexed to, and forming a part of, this specification.

Referring to Fig. 1, a source 1 of alternating-current supply is connected to polyphase mains 2, 3 and 4 of an electrical power-distributing system. Unbalanced-load conditions may be imposed on this distributing system, for example, by connecting translating devices (not shown) to a single-phase feeder 5 that is connected across the phase 3—4 of the distributing system. The loads obtaining in the feeder circuit 5 tend to lower the voltage between the mains 3 and 4. At the same time that these unbalanced voltage conditions obtain, unbalanced-current conditions in the several phases of the distributing system will exist.

To correct this unbalancing of the voltages between the distributing mains, I provide a phase balancer 6 which, in this instance, comprises a main induction-type dynamo-electric machine 7 and an auxiliary induction-type dynamo-electric machine 8. A polyphase winding 9 of the main machine 7 is connected by leads 10, to the distributing circuit. In this instance, the winding 9 is presumed to be stationary. A winding 10$^a$ shown as a delta-connected winding is mounted upon the rotor of the main machine 7.

The auxiliary machine 8 is likewise provided with a stationary polyphase winding 11 and a rotatable winding 12 mounted upon its rotor. The rotors of the machines 7 and 8 are mounted upon a common shaft 13. In consequence thereof, the speeds of rotation of the rotors of the two machines 7 and 8 are identical.

The stationary winding 11 of the auxiliary machine 8 is shown as being a modified delta-connection from which a plurality of taps 14, arranged in spaced groups, extend to commutator bars of commutator cylinder segments 15. Current-conducting brushes 16, which are spaced 120 electrical degrees from one another on a holding bracket 17, slidingly engage the commutator-cylinder segments 15. The brushes 16 are connected through leads 18, Y-connected resistors 19, resonating elements 20 and conductors 21 and 22, to spaced taps upon the rotor winding 10$^a$ of the main machine 7. The same taps on the rotor winding 10$^a$ are also connected to corresponding taps on the rotor winding 12 of the auxiliary machine 8.

The bracket 17, supporting the brushes 16, may be manually operated by means of a handle 23 or actuated electromagnetically by means of control magnets 24. The control magnets 24 comprise plungers that project into energizing coils 25 which, in turn, are severally excited by being connected across two of the phases of the polyphase distributing system. The plungers of the electromagnets 24 engage the bracket 17 through a pin-and-slot connection 26. When the voltages of the two phases with which the energizing windings 25 are associated are equal, the bracket 17 will be maintained stationary. When unbalanced voltage conditions obtain in the distributing system, the energizing coils 25 exert an unbalanced pull upon the associated plungers, thereby automatically rotating the bracket 17 to the point where balanced-voltage conditions will be restored in the distributing system, as hereinafter explained.

The auxiliary machine 8 is so designed and the distributed non-salient pole winding 11 is so applied that the auxiliary machine possesses twice as many poles as the main machine 7. Inasmuch as it is difficult to illustrate in the figure this relationship between the two machines, I have applied notations to the drawing to the effect that the main machine comprises two poles and the auxiliary machine four poles. This specific relation is purely arbitrary but serves to specify that the auxiliary machine is to be provided with twice as many poles as the main machine.

To understand the operation of my phase-balancing means, consider that the unbalanced-load conditions obtaining in the distributing system cause unbalanced voltages to be impressed upon the terminals of the stator winding 9 of the main machine 7. The resulting unbalanced polyphase currents flowing in the several phases of the winding 9 generate a resultant magnetic field which is manifested by two component, synchronously-rotating systems of balanced polyphase magneto-motive forces, one component system of magneto-motive forces having the same phase-rotation as the direction of rotation of the rotor winding $10^a$ and the other component system of magneto-motive forces having a phase-rotation which is opposite to the direction of rotation of the rotor winding $10^a$. The balanced-component system of magneto-motive forces having a phase-rotation in the direction of rotation of the rotor winding $10^a$ is the one that I have previously designated as being the load component.

The balanced-component system of magneto-motive forces having a phase rotation that is opposite to the rotation of the rotor winding $10^a$ is the one that I have previously designated as being the unbalancing-component. Since the machine 7 is of the induction type, the relative speed of rotation between the load-component system of magneto-motive forces and the rotor winding $10^a$ corresponds to slip frequency. Therefore, the load-component magneto-motive forces generate alternating currents in the rotor winding $10^a$ that have a frequency corresponding to slip frequency of the main machine 7. Again, the unbalancing component magneto-motive forces, because of their counter-phase rotation relative to the rotor winding $10^a$, induce alternating currents in the rotor winding $10^a$ that have a frequency corresponding to synchronous frequency plus the frequency corresponding to the speed of rotation of the rotor winding $10^a$. In other words, the alternating currents induced in the rotor winding $10^a$ by the unbalancing component magneto-motive forces have a frequency corresponding to double-synchronous frequency minus slip frequency.

If, under all conditions, the effective impedance offered to the flow of the unbalancing-component currents traversing the winding 9 were reduced to zero, the voltages across the terminals of the main machine 7 would be maintained in symmetrical polyphase relationship with one another which balanced conditions, on being reflected upon the distributing system, would maintain symmetrical polyphase conditions therein. The effective impedance offered by the winding 9 to the flow of the unbalancing-component currents is reduced to zero by subjecting the system of balanced polyphase magneto-motive forces generated by these unbalancing currents in the main machine 7 to another system of balanced magneto-motive forces of the proper frequency, phase displacement and magnitude, in order to completely neutralize the former.

The unbalancing component system of magneto-motive forces in the main machine 7 induces polyphase currents of a frequency corresponding to synchronous frequency plus the frequency of the rotor speed in the rotor winding $10^a$. Again, the magneto-motive forces arising from these induced currents tend to react upon the said inducing magneto-motive forces to reduce them to zero, in accordance with a well known principle. Because of the imperfect magnetic coupling between the inducing winding 9 and the induced winding $10^a$, by reason of the magnetic leakage between said windings, their resistance and their reactance, the super-synchronous currents induced in the winding $10^a$ are not of sufficient magnitude to completely neutralize the unbalancing component system of magneto-motive forces. To this end, alternating currents of the proper frequency, magnitude and phase displacement, namely those generated in the rotor winding 12 of the auxiliary machine 8, are introduced into the winding $10^a$ of the main machine 7 to augment the super-synchronous frequency currents induced therein.

If the currents thus introduced into the winding $10^a$ are of the proper magnitude, phase displacement and phase rotation, the unbalanced system of magneto-motive forces will be completely neutralized and the effective impedance offered by the winding 9 to the flow of unbalancing component currents will be reduced to zero. The unbalancing component of the load is thus offered zero impedance in the winding 9 of the main machine 7 and, therefore, the terminal voltages of said machine are maintained in symmetrical relationship under all load conditions. These balanced conditions are reflected upon the distributing system and, as a result, it operates under balanced polyphase conditions, irrespective of the loading of the several phases.

To generate currents of the proper frequency in the auxiliary machine 8 and to automatically maintain them of the proper frequency, irrespective of the speed of rotation of the rotor winding $10^a$ of the main machine 7, the stationary winding 11 of the auxiliary machine 8 is excited with alternating currents having a frequency corresponding to slip frequency. The exciting currents traversing the winding 11 are generated in the rotor winding $10^a$ of the main machine 7 and are conducted to the winding 11 through the conductors 18, the resistors 19, the elements 20 and the conductors 21 and 22. The resonating shunts 20 comprise adjustable inductive reactances and condenser reactance elements connected in parallel relationship, as is well known in the art. These elements are tuned to the frequency of the unbalancing-component currents induced in the rotor winding $10^a$. As a result, the super-synchronous currents induced in the rotor winding $10^a$ are precluded from flowing in the stator winding 11 of the auxiliary machine 8, while the currents of slip frequency are freely admitted to the winding 11.

Again, the winding 11 is so disposed on the stator of the auxiliary machine that twice as many poles are formed as are possessed by the main machine 7. Since the winding 11 is excited with alternating currents of slip frequency, and at the same time, it possesses twice as many poles as the main machine 7, the frequency of the currents induced in the rotor winding 12, which rotates at the same speed as the rotor winding $10^a$, corresponds to synchronous frequency plus the frequency of rotation of the rotor winding $10^a$. In this manner, currents of the proper frequency are generated for augmenting the currents induced in the rotor winding $10^a$ by the unbalancing component magneto-motive forces obtaining in the main machine 7.

The magnitude of the electromotive forces induced in the rotor winding 12 is controlled by varying the resistors 19 which, in turn, control the value of the exciting currents supplied to the inducing winding $10^a$ The phase displacement between the alternating currents induced in the rotor winding 12 and the super-synchronous currents obtaining in the rotor winding $10^a$ is controlled by means of the handle 23 attached to the bracket 17 or by the electromagnets 24, as hereinbefore explained.

From the foregoing, it will be apparent that currents of the proper phase displacement, frequency, phase rotation and magnitude are supplied to the rotor winding $10^a$ in order to augment the currents induced therein by the unbalancing-component magneto-motive forces resulting from the unbalanced currents traversing the stator winding 9. In consequence thereof, the effective impedance of the stator winding 9 to the unbalancing-component currents obtaining in the distributing system is reduced to zero.

In Fig. 2, the distributing system shown is similar, in some respects, to the system of Fig. 1. In this modified form, the main machine 28 corresponds to the main machine 7 of the aforementioned system. A polyphase rotor winding 29 is connected, by means of conductors 30, to a polyphase rotor winding 31 of an auxiliary machine 32. Since the main machine 28 is an induction-type machine, the frequency of the currents to be introduced into the rotor winding 29 thereof, in order to maintain symmetrical polyphase voltages at the terminals of the main machine, must correspond to synchronous frequency plus the frequency corresponding to the rotor speed. To this end, the auxiliary machine 32 is provided with two stationary, polyphase exciting windings 33 and 34 which are severally excited, through adjustable transformers 35 and 36, respectively, from the three phase mains 2, 3 and 4. Moreover, the nonsalient poles formed by these stationary windings are displaced with respect to one another so that the phase position of the resultant magnetic field may be adjusted.

Each of the stator windings 33 and 34 comprises the same number of poles as the stator winding of the main machine 28. Poles formed by the exciting windings of the machine 32 and simultaneously having the same polarity are displaced from one another so that, by separately varying the excitation of the separate exciting windings, the phase of the resultant field influencing the rotor winding 31 may be adjusted. The excitation of the two windings 33 and 34 is separately controlled by means of varying the taps upon the transformers 35 and 36. Since the frequency of the resultant exciting field corresponds to synchronous frequency and the rotor winding 31 is rotated at rotor frequency in a direction opposite to the phase-rotation of this resultant magnetic field, the frequency of the currents induced in the rotor winding 31 is equal to synchronous frequency plus the frequency corresponding to the speed of rotation of the rotor winding 29. In consequence thereof, currents of the proper frequency are generated in the auxiliary machine 32 which, in turn, are introduced into the rotor winding 29 of the main machine 28 in order to augment the currents induced therein by the unbalancing-component magneto-motive forces obtaining in the main machine. As explained above, symmetrical polyphase voltages are therefore impressed across the terminals of the stator winding of the main machine 28 which, in turn, maintains balanced polyphase conditions in the distributing system because the reactions offered by the main machine 28 to the unbalancing-component currents are reduced to zero.

It is obvious, from the foregoing description of the several systems, that my phase-balancing means may be employed as a phase-splitter to convert alternating currents of one number of phases into alternating currents of another number of phases. To illustrate, single-phase alternating current may be supplied through the circuit 5 and balanced three-phase currents will consequently be furnished to the three-phase mains 2, 3 and 4.

While I have shown my invention in a plurality of forms, those skilled in the art will appreciate that my invention is not limited to any specific form but is susceptible of various changes and modifications that do not depart from the spirit and scope of the appended claims.

I claim as my invention:

1. A phase balancer comprising a polyphase, induction-type dynamo-electric machine having one of its windings adapted for connection to a polyphase-distributing system, and means for introducing rotating polyphase-magneto-motive forces in said machine in order to amplify its balancing action when connected to an alternating-current, unbalanced distributing system, said polyphase magneto-motive forces being adjustable in phase and magnitude and having a frequency corresponding to synchronous frequency plus the speed of rotation of said machine.

2. A phase balancer comprising a polyphase induction-type dynamo-electric machine having one of its windings adapted for connection to a polyphase-distributing system, and means for superposing upon the normal magneto-motive forces obtaining in said machine additional magneto-motive forces of proper phase and magnitude and having a frequency corresponding to synchronous frequency plus the rotor speed of the machine in order to maintain balanced polyphase conditions in said winding.

3. A phase balancer comprising a dynamo-electric machine having a winding adapted for connection to a polyphase distributing system, a second polyphase winding in inductive relation thereto which rotates at less than synchronous speed, and means for supplying currents to said second winding to augment the currents induced therein by the unbalancing-component magneto-motive forces resulting from the unbalancing-component currents traversing the said first winding, in order to improve the balancing action of said machine.

4. A phase balancer comprising a main polyphase induction-type dynamo-electric machine, an auxiliary machine generating alternating currents having a frequency corresponding to synchronous frequency plus the frequency of the rotor speed of said main machine, means for introducing the currents generated in the auxiliary machine into the winding of the main machine which is not connected to the distributing system, the phase rotation of said auxiliary machine being such that the terminal electromotive forces of said main machine may be maintained in symmetrical polyphase relationship, and means for relatively changing the phase displacement between the voltages or rotor windings of said machines.

5. A phase balancer comprising a dynamo-electric machine having a polyphase stationary winding and a polyphase rotatable winding, one of said windings being adapted for connection to a polyphase distributing system and the relative speed between said windings being less than synchronous speed, and means for conductively supplying currents to a plurality of circuits of the winding not adapted for connection to the distributing system in order to augment the currents induced therein by the unbalancing-component magneto-motive forces resulting from the unbalanced currents traversing the winding adapted for connection to the distributing system.

6. A phase balancer comprising a polyphase dynamo-electric machine having a stationary winding and a rotating winding, one of which is adapted for connection to a polyphase-distributing system, and the relative speed of rotation between said windings being less than synchronous speed, and means for conductively supplying alternating currents of the proper phase and magnitude and of a frequency less than double-synchronous frequency to the winding not adapted for connection to said distributing system in order to augment the currents induced therein by the unbalanced-component magneto-motive forces resulting from the unbalanced currents traversing the winding connected to the distributing system.

7. A phase balancer comprising a polyphase dynamo-electric machine having a stationary polyphase winding and a rotating polyphase winding, one of which is adapted for connection to a polyphase-distributing system and the relative speed of rotation between said windings being different from synchronous speed, and means for conductively supplying alternating currents of the proper phase and magnitude and of a frequency not a multiple of synchronous frequency to the winding not adapted for connection to the distributing system in order to augment the currents induced therein by the unbalancing-component magneto-motive forces resulting from the unbalanced currents traversing the winding adapted for connection to the distributing system.

8. A phase balancer comprising a main polyphase dynamo-electric machine having a stationary and a rotating winding, one of which is adapted for connection to a polyphase-distributing system and the speed of rotation of the rotating winding being less than synchronous speed, an auxiliary dynamo-electric machine for generating alternating currents having a frequency corresponding to the frequency of the currents induced in that winding of the main machine which is not connected to the distributing system by the flow of the unbalancing-component currents traversing the other winding, and conductors for introducing these currents from the auxiliary machine into said winding of the main machine not connected to the distributing system.

9. A phase balancer comprising a main polyphase dynamo-electric machine having a stationary and a rotating winding, one of which is adapted for connection to a polyphase-distributing system and the speed of rotation of the rotating winding being less than synchronous speed, an auxiliary dynamo-electric machine generating alternating currents that have a frequency corresponding to the frequency of the currents induced in that winding of the main machine which is not connected to the distributing system by the flow of the unbalancing-component currents traversing the other winding, and conductors for introducing the currents from the auxiliary machine into the main machine for neutralizing the reactions set up therein by the unbalancing component of the currents obtaining in the distributing system.

10. A phase balancer comprising a main polyphase dynamo-electric machine having a stationary and a rotating winding, one of which is adapted for connection to a polyphase-distributing system and the speed of rotation of the rotating winding being less than synchronous speed, an auxiliary dynamo-electric machine generating alternating currents having a frequency corresponding to the frequency of the currents induced in that winding of the main machine which is not connected to the distributing system by the flow of the unbalancing-component currents traversing the other winding, means whereby the phase and magnitude of the currents induced in said auxiliary machine may be adjusted, and conductors for introducing the currents from the auxiliary machine into the winding of the main machine not connected to the distributing system.

11. A phase balancer comprising a main polyphase dynamo-electric machine having a stationary and a rotating winding, one of which is adapted for connection to a polyphase distributing system, an auxiliary dynamo-electric machine having two exciting polyphase windings and a third winding in inductive relation thereto, said exciting windings of the auxiliary machine being adapted for connection to the polyphase distributing system, means for independently varying the excitation of said windings, conductors extending between the rotating winding of the main machine and the said third winding of the auxiliary machine, and a rigid mechanical connection between the rotating windings of both machines.

12. An induction machine aggregate, comprising a main polyphase primary winding adapted to be connected to a polyphase line in forward phase-sequence, a pair of auxiliary polyphase primary windings adapted to be connected to said line in backward phase-sequence, said auxiliary primary windings being displaced with respect to each other, means for adjusting the strengths of the useful flux produced by the respective auxiliary primary windings, and secondary windings including a plurality of circuits, each of which is subjected to the influence of the flux produced by both said main and auxiliary primary windings.

13. An induction machine aggregate, comprising main and auxiliary polyphase primary windings adapted to be connected respectively in forward and backward phase-sequence to a polyphase line, means for adjusting the magnitude and angular position of the useful flux produced by said auxiliary primary windings, and secondary windings including a plurality of circuits, each of which is subjected to the influence of the flux produced by both said main and auxiliary primary windings.

In testimony whereof, I have hereunto subscribed my name this 28th day of Oct. 1916.

CHARLES LE G. FORTESCUE.